Dec. 17, 1929.  G. STANCU, JR  1,740,319
VALVE FOR TANK CARS AND THE LIKE
Filed April 1, 1927  2 Sheets-Sheet 2
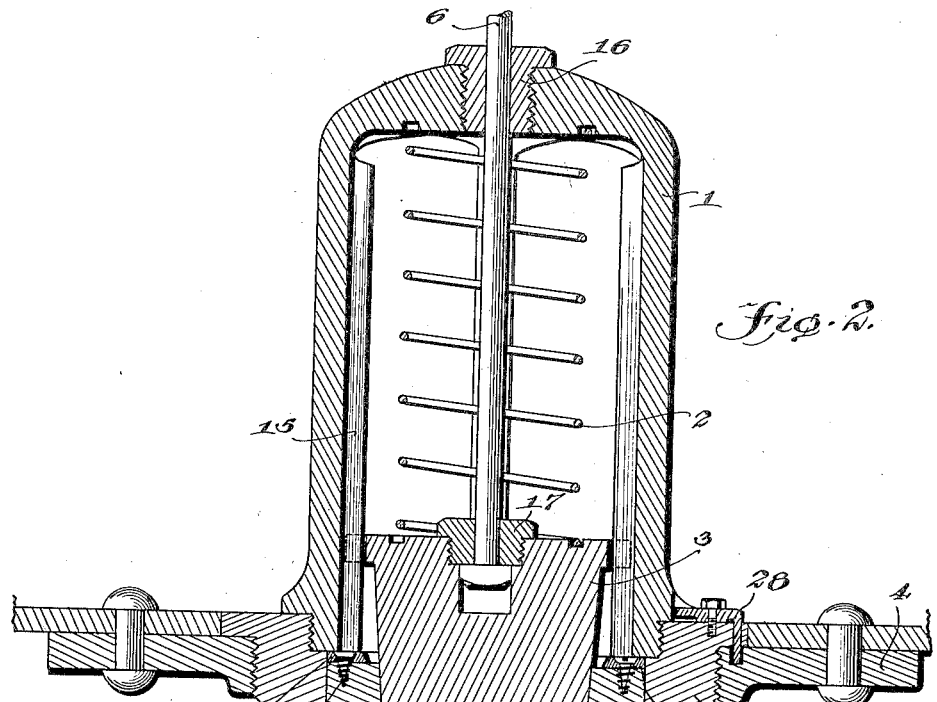
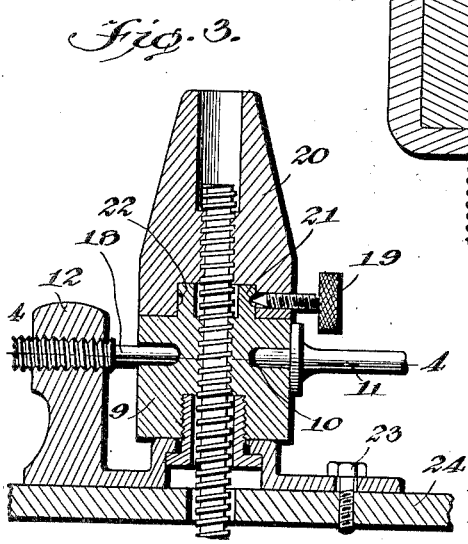
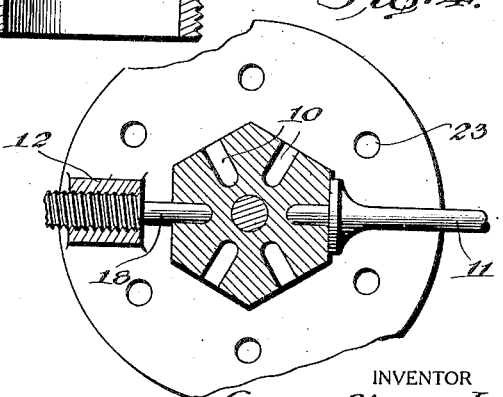
WITNESSES
INVENTOR
George Stancu, Jr.
BY
ATTORNEYS Patented Dec. 17, 1929

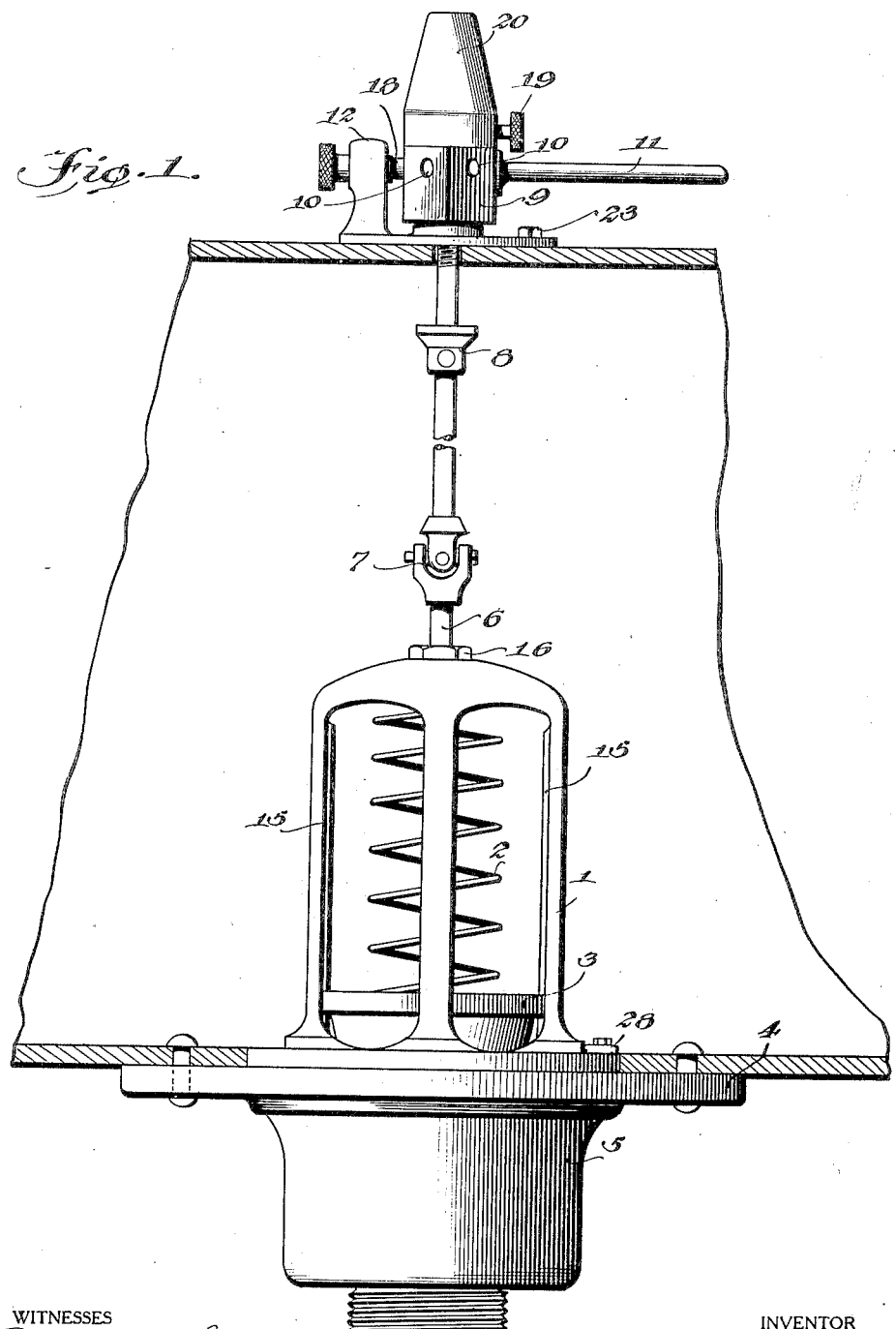

1,740,319

UNITED STATES PATENT OFFICE

GEORGE STANCU, JR., OF PHILADELPHIA, PENNSYLVANIA

VALVE FOR TANK CARS AND THE LIKE

Application filed April 1, 1927. Serial No. 180,186.

The present invention relates to a valve, particularly a valve adapted to be installed in a tank or tank car or the like, where liquids are to be stored or conveyed. It seeks to provide a valve which will be positively and tightly closed to prevent escape of the liquid, and one which may be opened to any desired extent, or position, and locked when in that position. It also seeks to provide a means for locking the valve in closed position, in order to prevent accidental opening or tampering of the valve which would result in loss of the liquid in the tank. The valve is of a somewhat different type, but in general analogous to the type of valve shown in the copending application Serial No. 165,664 filed February 3rd, 1927.

The valve is illustrated in the accompanying drawings in which,

Figure 1 represents a perspective view of the valve installed in a tank or the like.

Figure 2 represents a vertical section through the middle of the valve structure.

Fig. 3 is a sectional view through the locking mechanism, and

Figure 4 is a section on the line 4—4 of Figure 3, the same being a horizontal section of the locking mechanism.

Referring to the drawings the valve comprises a frame or casing 1 which is open usually over the major part of the surface in order to permit a free and ready access of the liquid to the valve. As shown in Figure 1, it usually consists of an open framework such as illustrated. Within this frame 1 is the spring 2 which is adapted to be compressed by a twisted motion imparted to the shaft 6.

This shaft 6 is secured to the valve 3 by means of the bushing 17 engaging the said valve in any desired way, as by a threaded engagement.

The frame 1 is screwed into casing 25 which carries within it the member 13 of hard rubber or soft metal bushing acting as a seat for the valve 3. Member 13 is apertured as shown at 14 to receive the valve 3, the inclinations of the sides of the aperture 14 corresponding with the inclination of the periphery of the valve. Between the casing or frame 1 and the member 13 there is placed a brass washer 26 secured to member 13 by any desired means as by screws 27, for example.

The casing 1 engages the casing 25 and is secured thereby as for example by threads as shown in Figure 1, the casing 1 being provided with a flange at its lower end adapted to receive the clamped member 28 secured within the flange and plate 4, the said clamp 28 being secured in close contact with the flange of the frame 1 by means of a screw or other member equivalent thereto.

The valve is provided with a mechanism to lock it in a plurality of positions, this locking means being generally indicated by the cap 9 as shown on Figures 1 and 3. This cap 9 is polygonal in shape there being as many sides as positions desired for the locking of the valve. Member 9 carries a flange by means of which it is bolted to the top of the tank 24 as shown at 23. This flange also carries member 12 which acts as a bearing for the locking device 18, this device 18 passing through member 12 and being adapted to be pressed within the opening 10 of the member 9. This pressure may be effected by providing the member 18 with a threaded engagement with the bearing 12, or obviously any other provision serving the same purpose will be equivalent thereto.

As previously indicated member 9 which is adapted to rotate and to which the shaft 6 of the valve is secured, is provided with a plurality of sides, each side carrying an aperture 10 by means of which shaft a valve may be turned or locked for turning the valve, the key 11 is inserted into one of the openings and the member 18 released from contact with its aperture, member 11 being employed as a lever to effect the turning motion of the member 9. This member 9 is provided with a collar 21 (Figure 3) which extends upwardly to fit into recess 22 on member 9. Cap 20 provides a protection for the shaft 6 when the latter is brought into a raised position. The cap 20 is secured to the member 9 by means of a thumb screw 19 engaging depressions 22 in the bushing 21.

When it is desired to operate the valve, member 18 is released from the aperture 10 into which it has been placed and pressure is applied to member 11, inserted in one of the said apertures 10. By the rotation of member 11 member 9 is rotated and raises shaft 6 through the bushing 16, this motion compressing the spring 2 and drawing the valves 3 upwards along channels 15 thereby opening the valve. The valve may be retained in any desired position bringing one of the openings 10 of the member 9 into registration with the device 18 and manipulating member 18 in such a manner as to bring that into engagement with the opening where it will be obvious that the position of the valve is secured.

The member 6 is provided with a stop 8 which will prevent the valve from being raised to an undue height, and there is also provided a universal joint 7 which will permit the member 9 to be offset if such a provision is found to be desirable.

When it is desired to close the valve the lever 11 is inserted at an appropriate distance, the locking device 18 is withdrawn from the aperture and the releasing of the spring causes the closing of the valve by lowering the member 3.

It will thus be seen that there is provided a valve which is positive in its operation, comparatively easy to manufacture and which would efficiently serve as a stoppage for the discharge opening of any tank, tank car or the like.

I claim:—

1. A valve comprising a casing, a valve within said casing, a member carried by said valve, a radially movable screw holding means cooperative with said member, and detachable means for operating said member for the actuation of said valve upon the release of said holding means.

2. A valve comprising a casing, a normally closed valve within said casing, a member connected to said valve, a radially movable screw holding means adapted for locking engagement with said member, a detachable operating means for said member for actuating said valve to move the same to open position after the release of said holding means, said holding means also being adapted for engagement with said member in selected positions of opening of said valve, and means for automatically returning said member and said valve to normally disposed positions upon the release of said holding means from its last mentioned engagement with said member.

3. A valve comprising a casing, a normally closed valve within said casing, a member carried by said valve, a radially movable screw holding means adapted for locking engagement with said member, a detachable operating means for said member for actuating said member to move said valve to open position after the release of said holding means, said holding means also being adapted for retaining engagement with said member in selected positions of opening of said valve and spring means for automatically returning said head and said valve to normally disposed positions upon the release of said holding means from its last mentioned engagement with said member.

4. The combination with a valve including a rotatable body, of an apertured head rotatable with the valve body, a holding means for said valve body interchangeably engageable in the apertures of said head, and an actuating means also interchangeably engageable in the said apertures, whereby the head and valve body may be rotated upon the release of said holding means.

5. The combination with a valve including a rotatable valve body, and means for holding the said valve body in varying positions of operation, said means comprising a rotatable head secured to said valve body and having a plurality of apertures formed in the same, a holding member adapted to be engaged in any one of the apertures of said head when in registry therewith, and means for releasing said holding means from the aperture engaged thereby.

6. A valve comprising a movable valve member, a spring cooperative with said valve member and adapted to exert a tension on the same to effect its operation through a rotative movement, a polygonal head secured to one end of said valve member, said head being apertured on each of its sides, a holding means adapted for selective engagement with the apertures of said head, and means for engaging the said apertures to actuate the valve member to any desired position of operation upon the release of said holding means.

GEORGE STANCU, Jr.